US00RE49463E

(19) United States
(12) Reissued Patent
Worsham

(10) Patent Number: US RE49,463 E
(45) Date of Reissued Patent: Mar. 14, 2023

(54) PUSHBUTTON SWITCH WITH LIGHT-TRANSMITTING INDICIA ON THE PUSHBUTTON

(71) Applicant: David Worsham, Santa Rosa Beach, FL (US)

(72) Inventor: David Worsham, Santa Rosa Beach, FL (US)

(21) Appl. No.: 17/399,196

(22) Filed: Aug. 11, 2021

Related U.S. Patent Documents

Reissue of:
(64) Patent No.: 10,777,370
Issued: Sep. 15, 2020
Appl. No.: 15/861,549
Filed: Jan. 3, 2018

(51) Int. Cl.
*H01H 13/02* (2006.01)
*H01H 1/40* (2006.01)
*H01H 1/58* (2006.01)
*H01H 9/18* (2006.01)

(52) U.S. Cl.
CPC ..... *H01H 13/023* (2013.01); *H01H 1/403* (2013.01); *H01H 1/5805* (2013.01); *H01H 9/182* (2013.01); *H01H 2013/026* (2013.01); *H01H 2219/014* (2013.01); *H01H 2219/037* (2013.01); *H01H 2219/064* (2013.01); *H01H 2239/004* (2013.01)

(58) Field of Classification Search
CPC .... H01H 13/023; H01H 1/403; H01H 1/5805; H01H 9/182; H01H 2013/026; H01H 2219/014; H01H 2219/037; H01H 2219/064; H01H 2239/004; H01H 13/585; H01H 2219/008; H01H 2219/036
USPC ..... 200/314, 310
See application file for complete search history.

(56) References Cited

U.S. PATENT DOCUMENTS 3,467,802 A * 9/1969 Martin ..... H01H 13/023 200/314
5,150,257 A * 9/1992 Mohabbatizadeh ..... H01H 13/023 349/1
5,659,297 A * 8/1997 Tatavoosian ..... F21V 29/004 200/310
6,180,905 B1 * 1/2001 Pollock ..... H01H 13/023 200/314

(Continued)

FOREIGN PATENT DOCUMENTS

GB 2269686 * 2/1996

*Primary Examiner* — Kenneth Whittington
(74) *Attorney, Agent, or Firm* — Lanier Ford Shaver & Payne, PC; Gerald M. Walsh

(57) ABSTRACT

An illuminated pushbutton for a pushbutton switch having a light transmitting pushbutton and an indicia cover that is attached to a front end of the light transmitting pushbutton. The indicia cover has non-light transmitting regions and light transmitting regions on its front surface, wherein the light transmitting regions provide visible, light-transmitted indicia on the light transmitting pushbutton. The indicia cover has an adhesive on its rear surface to attach the indicia cover to the front end of the light transmitting pushbutton. An LED in the pushbutton switch is constructed to transmit light to the indicia cover. The light passes through the light transmitting regions (symbols and letters) but not through the non-light transmitting regions. As the light passes through the light transmitting symbols and letters, the symbols and letters are lighted and visible in the dark.

9 Claims, 3 Drawing Sheets

(56) References Cited

U.S. PATENT DOCUMENTS

| | | | | |
|---|---|---|---|---|
| 6,310,308 | B1 * | 10/2001 | Watson | H01H 13/023 200/314 |
| 6,417,469 | B1 * | 7/2002 | Tamura | H01H 13/14 200/314 |
| 6,654,077 | B1 * | 11/2003 | Bui | G02F 1/133308 445/66 |
| 7,514,643 | B1 | 4/2009 | Tittle | |
| 7,775,872 | B2 * | 8/2010 | Bleich | G07F 17/3262 463/20 |
| 10,139,853 | B2 * | 11/2018 | Choi | G05G 25/00 |
| 10,297,404 | B1 * | 5/2019 | Ho | H01H 13/06 |
| 2002/0021562 | A1 * | 2/2002 | Tholin | H01H 13/023 362/23.18 |
| 2004/0118669 | A1 * | 6/2004 | Mou | H01H 9/12 200/310 |
| 2005/0224322 | A1 * | 10/2005 | Kikuya | H01H 9/181 200/11 R |
| 2006/0019053 | A1 * | 1/2006 | Jacoby | G09F 13/04 428/40.1 |
| 2007/0246337 | A1 * | 10/2007 | Verdu | H01H 13/023 200/314 |

* cited by examiner

PUSHBUTTON SWITCH WITH LIGHT-TRANSMITTING INDICIA ON THE PUSHBUTTON

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates to lighted pushbutton switches and, more particularly, to a pushbutton with an indicia cover that provides lighted indicia on the pushbutton.

BACKGROUND OF THE INVENTION

It is often desirable to have a light on or within a switch so that it can be found in the dark or in low lighting. Toggle switches, for example, are known to be constructed with lights. Pushbutton switches are commonly used for ON-OFF switching or for toggling between alternative applications. U.S. Pat. No. 7,514,643 discloses a lighted pushbutton switch having a printed circuit board in the bottom of a housing, with a light emitting diode (LED) mounted on the board. A switch operating plunger at the top rotates a ratchet and electrical contact member whenever the plunger is depressed. The contact member engages conductive paths on the top of the PC board and moves from path to path as it is rotated to change the state of the switch. A transparent light pipe over the LED transmits light through the plunger. The light pipe fits through the ratchet and is rotated by the ratchet to rotate the electrical contact member. The light is projected trough the pushbutton where it is visible. However, in cases where several pushbutton switches are used to operate several devices it would be useful to have the pushbutton not only project light but also project indicia such as symbols or letters to indicate the function of the switch.

SUMMARY OF THE INVENTION

This invention is an illuminated pushbutton for a pushbutton switch having a light transmitting pushbutton and an indicia cover that is attached to a front end of the light transmitting pushbutton. The indicia cover has non-light transmitting regions and light transmitting regions on its front surface, wherein the light transmitting regions provide visible, light-transmitted indicia on the light transmitting pushbutton. The indicia cover has an adhesive on its rear surface to attach the indicia cover to the front end of the light transmitting pushbutton. A light emitting diode is constructed to transmit light to the indicia cover. The light transmitting pushbutton is positioned in a front end of a housing and the light emitting diode is positioned in a rear end of the housing. Components in the housing between the light emitting diode and the light transmitting pushbutton are constructed to allow transmission of light from the light emitting diode to the light transmitting pushbutton. A lens may be positioned adjacent to the front end of the light transmitting pushbutton and covered with a light transmitting cap. In this configuration, the indicia cover is attached to the surface of the light transmitting cap.

An advantage of the illuminated pushbutton of the present invention is illuminated indicia, such as symbols, numbers, and letters on the pushbutton that are visible in the dark.

Another advantage is illuminated indicia that are created by light passing through light transmitting templates on a surface of an indicia cover that is otherwise non-light transmitting.

Another advantage is an indicia cover that is reversibly attachable to a pushbutton cap and is replaceable with other indicia covers.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

Figure 1:
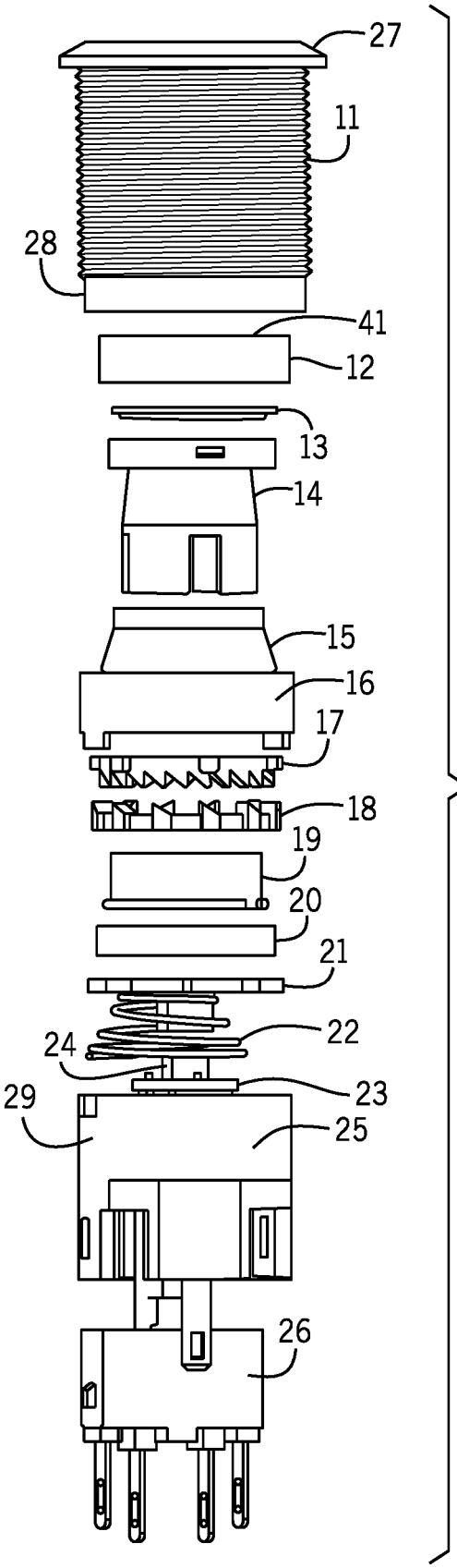
FIG. 1 shows an exploded view of a pushbutton switch having a light emitting diode to illuminate a light transmitting pushbutton.

FIG. 1 shows an exploded view of a pushbutton switch 10 having a light emitting diode 24 to illuminate a light transmitting pushbutton 14. The pushbutton switch 10 also has a light transmitting pushbutton cap 12, a silicon cap 15 having a ratchet chamber 16, a top ratchet 17 and a bottom ratchet 18 within the ratchet chamber 16, a ratchet locker 19, and a ratchet ring 20. The pushbutton 14 operates a switch board 21 mounted on a spring 22 as it engages a light emitting diode (LED) circuit board 23, by methods known in the art. The LED 24 is mounted on the circuit board 23 and provides illumination to the pushbutton 14. All of the internal components 14-22 are constructed to allow the passage of light from the LED 24 to the pushbutton cap 12. The circuit board 23 is mounted on a micro switch holder 25 which holds a micro switch 26. A lens 13 can be positioned on the pushbutton 14 and held in place by the light transmitting cap 12.

Figure 2:
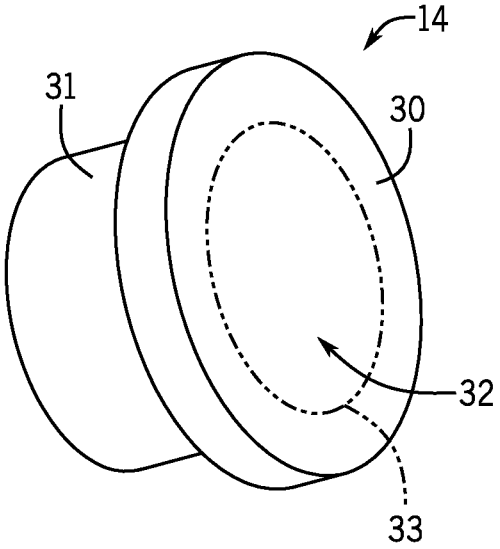
FIG. 2 shows a front perspective view of the light transmitting pushbutton of the present invention.

FIG. 2 shows a front perspective view of the light transmitting pushbutton 14. The pushbutton 14 has a front end 30, positioned on a stem 31. The pushbutton 14 may, alternatively, have an opening 33 (shown by the dashed line) on the front end 30 which opens into a hollow interior 32 of the pushbutton 14.

Figure 3:
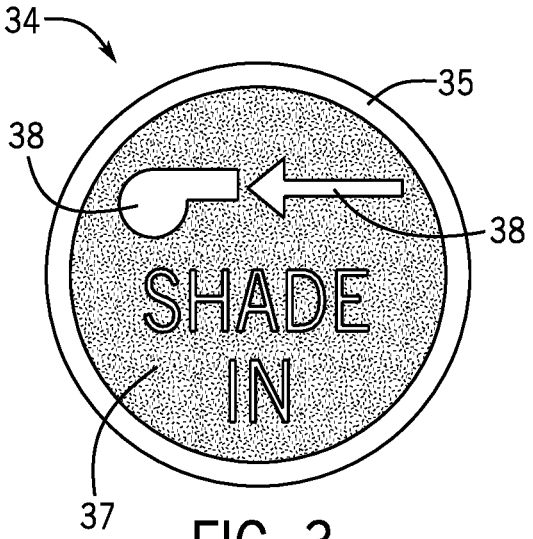
FIG. 3 shows the front of an indicia cover of the present invention that has non-light transmitting regions and light transmitting regions, wherein the light transmitting regions provide indicia.
Figure 4:
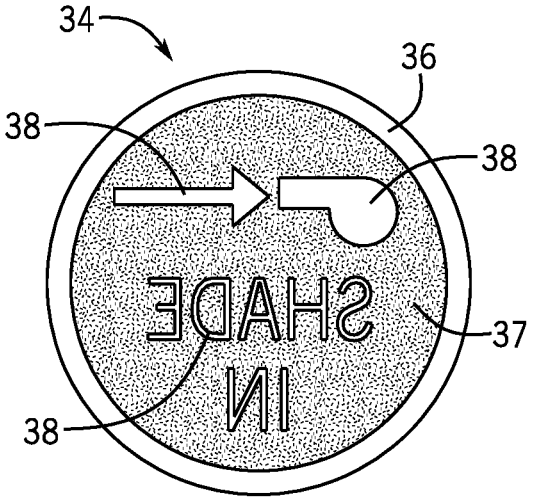
FIG. 4 shows the back of the indicia cover which has adhesive for attaching the indicia cover to a front end of the light transmitting pushbutton.
Figure 5:
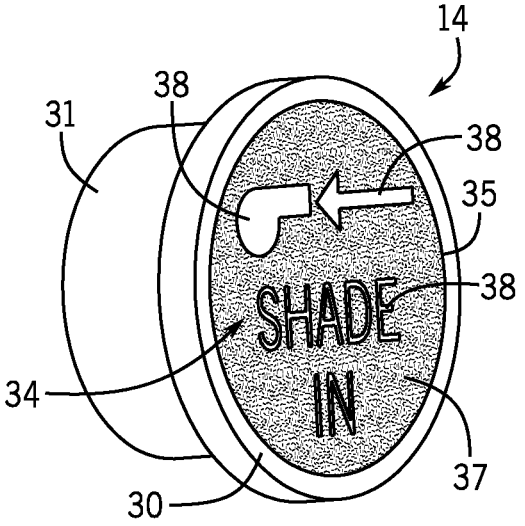
FIG. 5 shows the indicia cover attached to the front end of the light transmitting pushbutton.

FIGS. 3 and 4 show an indicia cover 34 having a front surface 35 and a rear surface 36. The indicia cover 34 has non-light transmitting regions 37 and light transmitting regions 38 on the front surface 35 and an adhesive on the rear surface 36 to attach the indicia cover 34 to the front end 32 of the pushbutton 14. FIG. 5 shows the indicia cover 34 attached to the front end 30 of the pushbutton 14. The light transmitting regions 38 provide visible indicia, such as symbols and letters, when the indicia cover 34 is attached to the pushbutton 14 and when the LED 24 provides light to the pushbutton 14 and to the indicia cover 34. In an alternate configuration a lens 13 may be positioned adjacent to the front end 30 of the light transmitting pushbutton 14 and covered with the light transmitting cap 12. In this configuration, the indicia cover 34 is attached to the surface 41 (see FIG. 1) of the light transmitting cap 12.

Figure 6:
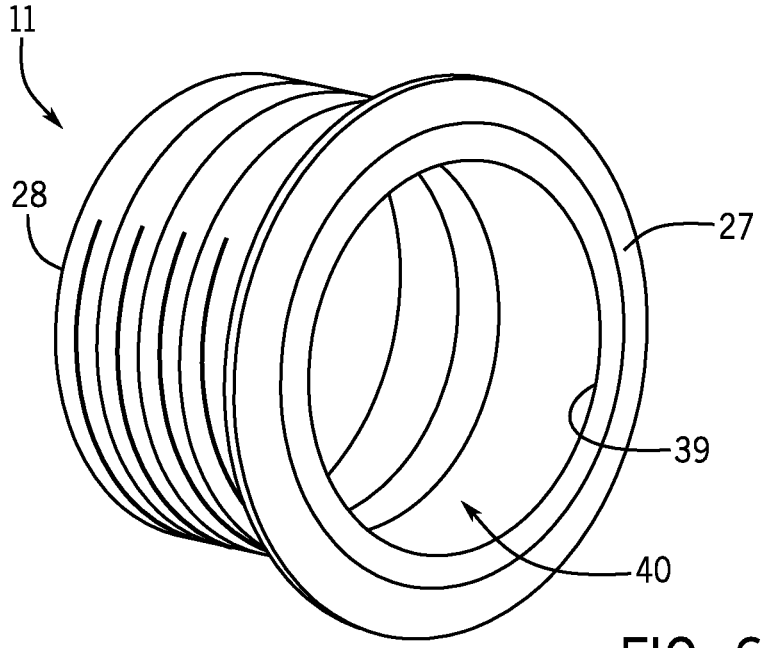
FIG. 6 shows a front perspective view of a housing of the pushbutton switch, further showing an interior of the housing.
Figure 7:
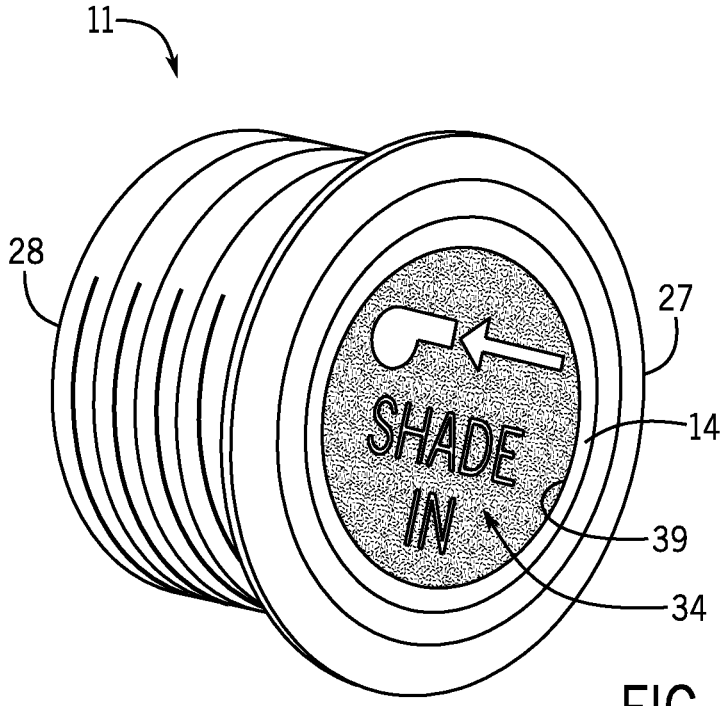
FIG. 7 shows a front perspective view of the housing of the pushbutton switch, further showing the light transmitting pushbutton, with the indicia cover attached thereto, positioned in the interior of the housing.

FIG. 6 shows a front perspective view of the housing 11 of the pushbutton switch 10, further showing an opening 39 into an interior 40 of the housing 11, at the front end 27 of the housing 11. FIG. 7 shows that the pushbutton 14, with the indicia cover 34 attached thereto, is positioned in the interior 40 of the housing 11. The front end 30 of the pushbutton 14 and the indicia cover 34 are positioned at the front end 27 of the housing 11.

The pushbutton 14 is made, preferably, of a plastic that allows the transmission of light. The indicia cover 34 is made, preferably, of a flexible plastic with the non-light transmitting regions colored black or a dark color. The light transmitting regions are clear plastic or are constructed as openings in the indicia cover 34. When the LED 24 is turned on light is transmitted from the LED 24, through the housing 11 of the pushbutton switch 10, to the pushbutton 14. The light passes through the light transmitting regions (symbols and letters) of the indicia cover 34 but not through the non-light transmitting regions. As the light passes through the light transmitting symbols and letters, the symbols and letters are lighted and visible. A lens 13 can be positioned on the pushbutton 14 and held in place by the pushbutton cap 12 to focus, disperse, or modify light from the LED 24 as desired.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the pushbutton and indicia cover can also be used in simple pushbutton switches that have an LED but no LED circuit board or ratchet mechanism. Any suitable types of plastic may be used to construct the pushbutton and the indicia cover. The plastics can be flexible or non-flexible. The non-light transmitting areas on the indicia cover can be any color. The light transmitting areas on the indicia cap can also be made of clear colored plastic. Any suitable adhesive may be used to attach the indicia cover to the pushbutton cap. Any type of lens can be used with the pushbutton.

It will be understood that various changes in the details, materials, and arrangements of the parts which have been described and illustrated above in order to explain the nature of this invention may be made by those skilled in the art without departing from the principle and scope of the invention as recited in the following claims.

I claim:

[1. An illuminated pushbutton for a pushbutton switch, comprising:

a) a pushbutton having a hollow interior, a front end with an opening, and a stem, wherein the front end of said pushbutton is positioned in a front end of a housing and a light source is positioned in a rear end of the housing;

b) an indicia cover having a front surface with a dark background and a rear surface, wherein the indicia cover is attached to the front end of said pushbutton; and c) said indicia cover is non-light transmitting and does not allow the passage of light from the light source through said indicia cover except for indicia positioned on said indicia cover, the indicia being light transmitting and allowing the passage of light through said indicia cover, wherein the light source transmits light from the rear end of the housing to the front end of the housing and to the rear surface of said indicia cover and wherein the light from the light source passes through the indicia and lights the indicia, making the indicia visible on the front surface of said indicia cover and on the front end of said pushbutton.]

2. The illuminated pushbutton of claim [1] *8* further comprising a lens positioned adjacent to the front end of said pushbutton and covered with a light transmitting cap.

3. The illuminated pushbutton of claim [1] *8*, wherein the light source is a light emitting diode.

4. The illuminated pushbutton of claim [1] *8* further comprising said indicia cover having an adhesive on its rear surface to attach said indicia cover to the front end of said pushbutton.

5. The illuminated pushbutton of claim [1] *8* further comprising components in the housing between the light source and said pushbutton being constructed to allow transmission of light from the light source to said pushbutton.

6. An illuminated pushbutton for a pushbutton switch, comprising:

a) a pushbutton having a hollow interior, a front end[with an opening], and a stem wherein the front end of said pushbutton is positioned in a front end of a housing and a light emitting diode [is positioned in a rear end of the housing] *transmits light through the housing to the pushbutton*;

b) an indicia cover having a front surface with a dark background and a rear surface, wherein the indicia cover is attached to the front end of said pushbutton;

c) said indicia cover is non-light transmitting and does not allow the passage of light from the light emitting diode through said indicia cover except for indicia positioned on said indicia cover, the indicia being light transmitting and allowing the passage of light through said indicia cover, wherein the light emitting diode transmits light [from the rear end of the housing] to the front end of the housing and to the rear surface of said indicia cover and wherein the light from the light emitting diode passes through the indicia and lights the indicia, making the indicia visible on the front surface of said indicia cover and on the front end of said pushbutton;

*d) said pushbutton being connected to a multipin pushbutton switch by connection of the stem of the push button to a silicon cap, the silicon cap having a ratchet system whereby said pushbutton operates the multipin pushbutton switch, wherein the front surface of said indicia cover is colored black or a dark color and the indicia are made of clear plastic or are openings in the indicia cover;*

[d] *e*) said indicia cover having an adhesive on its rear surface to attach said indicia cover to said front end of said light transmitting pushbutton; and

[e] *f*) components in the housing between the light source and said pushbutton being constructed to allow transmission of light from the light source to said pushbutton.

7. The illuminated pushbutton of claim [6] *10* further comprising a lens positioned adjacent to the front end of said pushbutton and covered with a light transmitting cap.

8. An illuminated pushbutton for a pushbutton switch, comprising:

a) a pushbutton having a hollow interior, a front end[with an opening], and a stem, wherein the front end of said pushbutton is positioned in a front end of a housing and a light source [is positioned in a rear end of the housing] *transmits light through the housing to the pushbutton*;

b) an indicia cover having a front surface with a dark background and a rear surface, wherein the indicia cover is attached to the front end of said pushbutton;

c) said indicia cover is non-light transmitting and does not allow the passage of light from the light source through said indicia cover except for indicia on said indicia cover, the indicia being light transmitting and allowing the passage of light through said indicia cover, wherein the light source transmits light [from the rear end of the housing] to the front end of the housing and to the rear surface of said indicia cover and wherein the light from the light source passes through the indicia and lights the indicia, making the indicia visible on the front surface of said indicia cover and on the front end of said pushbutton; and d) said pushbutton being connected to a multipin pushbutton switch by connection of the stem of the push button to a silicon cap, the silicon cap having a ratchet system whereby said pushbutton operates the multipin pushbutton switch, wherein the front surface of said indicia cover is colored black or a dark color and the indicia are made of clear plastic or are openings in the indicia cover.

9. The illuminated pushbutton of claim 8 further comprising a lens positioned adjacent to the front end of said pushbutton and covered with a light transmitting cap.

10. An illuminated pushbutton for a pushbutton switch, comprising:

a) a pushbutton having a hollow interior, a front end[with an opening], and a stem, wherein the *front end of said* pushbutton is positioned in a front end of a housing and a light source [is positioned in a rear end of the housing and wherein a lens is positioned adjacent to said the front end of said light transmitting pushbutton, said lens being covered with a light transmitting cap] *transmits light through the housing to the pushbutton*;

b) an indicia cover having a front surface with a dark background and a rear surface, wherein the indicia cover is attached to the [light transmitting cap] *front end of said pushbutton*; [and]

c) said indicia cover is non-light transmitting and does not allow the passage of light from the light source through said indicia cover except for indicia positioned on said indicia cover, the indicia being light transmitting and allowing the passage of light through said indicia cover, wherein the light source transmits light [from the rear end of the housing] to the front end of the housing and to the rear surface of said indicia cover and wherein the light from the light source passes through the indicia and lights the indicia, making the indicia visible on the front surface of [the] said indicia cover and on the [light transmitting cap.] *front end of said pushbutton;*

*d) said pushbutton being connected to a multipin pushbutton switch by connection of the stem of the push button to a silicon cap, the silicon cap having a ratchet system whereby said pushbutton operates the multipin pushbutton switch, wherein the front surface of said indicia cover is colored black or a dark color and the indicia are made of clear plastic or are openings in the indicia cover;*

*e) said indicia cover having an adhesive on its rear surface to attach said indicia cover to the front end of said pushbutton; and*

*f) components in the housing between the light source and said pushbutton being constructed to allow transmission of light from the light source to said pushbutton, wherein the light source is a light emitting diode.*

* * * * *